United States Patent
Yang et al.

(10) Patent No.: US 12,339,072 B2
(45) Date of Patent: Jun. 24, 2025

(54) HEAT EXCHANGING SYSTEM AND METHOD FOR DETERMINING IF THE FLOW OF COOLING MEDIUM IS TOO LOW

(71) Applicant: Carrier Corporation, Palm Beach Gardens, FL (US)

(72) Inventors: Min Yang, Shanghai (CN); Lingxiao Zhao, Shanghai (CN); Tao Shu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 210 days.

(21) Appl. No.: 18/154,063

(22) Filed: Jan. 13, 2023

(65) Prior Publication Data

US 2023/0228504 A1    Jul. 20, 2023

(30) Foreign Application Priority Data

Jan. 17, 2022  (CN) .......................... 202210047176.7

(51) Int. Cl.
  *F28F 27/00*    (2006.01)
  *F25B 49/02*    (2006.01)

(52) U.S. Cl.
  CPC .............. *F28F 27/00* (2013.01); *F25B 49/02* (2013.01); *F25B 2700/13* (2013.01); *F25B 2700/2103* (2013.01)

(58) Field of Classification Search
  CPC ....... F28F 27/00; F25B 49/02; F25B 2700/13; F25B 2700/2103; F25B 2700/21172; F25B 2700/21173
  See application file for complete search history.

(56) References Cited

U.S. PATENT DOCUMENTS

2011/0036113 A1* 2/2011 Kopko ................... F25B 30/02
  165/62
2017/0198707 A1* 7/2017 Umeda ................. F04D 29/444
  (Continued)

FOREIGN PATENT DOCUMENTS

| EP | 3217112 A1 | 9/2017 |
|----|------------|--------|
| EP | 3477221 B1 | 1/2020 |
| JP | 2009243828 A | 10/2009 |

OTHER PUBLICATIONS

European Search Report for Application No. 23151623.8, Issued May 19, 2023, 8 Pages.

*Primary Examiner* — Nelson J Nieves
(74) *Attorney, Agent, or Firm* — CANTOR COLBURN LLP

(57) ABSTRACT

A heat exchange system and a method for determining whether flow of cooling medium passing through a heat exchanger is too low. The heat exchange system includes a refrigerant flow path in which refrigerant circulates; a cooling medium flow path in which cooling medium circulates; and a heat exchanger connected to both the refrigerant flow path and the cooling medium flow path so that the refrigerant and the cooling medium exchange heat in the heat exchanger. The heat exchange system includes a first temperature sensor arranged at a cooling medium inlet of the heat exchanger, a second temperature sensor at a cooling medium outlet of the heat exchanger, and a controller in communication with the first temperature sensor and the second temperature sensor. The controller is configured to determine whether the flow of cooling medium in the heat exchanger is too low based on a temperature difference.

9 Claims, 3 Drawing Sheets

(56) References Cited

U.S. PATENT DOCUMENTS

| | | | |
|---|---|---|---|
| 2021/0108843 A1* | 4/2021 | Togano | F25B 49/005 |
| 2021/0116156 A1* | 4/2021 | Waters | F25B 41/22 |
| 2022/0290692 A1* | 9/2022 | Huthmacher | F25B 31/008 |
| 2022/0316747 A1* | 10/2022 | McGill | F24F 11/86 |
| 2024/0011681 A1* | 1/2024 | Fujii | F25B 41/20 |
| 2024/0247850 A1* | 7/2024 | Kadowaki | F25B 47/006 |

* cited by examiner

HEAT EXCHANGING SYSTEM AND METHOD FOR DETERMINING IF THE FLOW OF COOLING MEDIUM IS TOO LOW

FOREIGN PRIORITY

This application claims priority to Chinese Patent Application No. 202210047176.7, filed Jan. 17, 2022, and all the benefits accruing therefrom under 35 U.S.C. § 119, the contents of which in its entirety are herein incorporated by reference.

TECHNICAL FIELD OF INVENTION

The present invention relates to the field of heat exchange systems, and in particular to a method for determining whether the flow of cooling medium through a heat exchanger is too low in a heat exchange system and a heat exchange system using the same.

BACKGROUND OF THE INVENTION

For heat exchange systems, it is necessary to keep the flow of cooling medium such as water above threshold so as to protect the heat exchangers from freezing, especially in outdoor environments with low ambient temperatures. In order to monitor whether the flow of the cooling medium is too low, a differential pressure flow switch is usually arranged in the heat exchanger. As shown in FIG. 2, a differential pressure flow switch 19 is usually connected between a cooling medium inlet 163 and a cooling medium outlet 164 of a heat exchanger 16. The differential pressure flow switch 19 detects, through a diaphragm provided therein, the differential pressure between the two sides of the diaphragm, and operates in response to the differential pressure between the two sides, such as jump stop. Since the differential pressure flow switch has cooling medium in its own flow path 191, if frozen happens in the flow path 191, the differential pressure flow switch 19 will fail to operate.

SUMMARY OF THE INVENTION

The object of the present application is to solve or at least alleviate the problems existing in the prior art.

According to one aspect, a heat exchange system is provided, which comprises: a refrigerant flow path in which refrigerant circulates and a compressor is included; a cooling medium flow path in which cooling medium circulates; a heat exchanger connected to both the refrigerant flow path and the cooling medium flow path so that the refrigerant and the cooling medium exchange heat in the heat exchanger, wherein the heat exchange system further comprises a first temperature sensor at a cooling medium inlet of the heat exchanger, a second temperature sensor at a cooling medium outlet of the heat exchanger, and a controller in communication with the first temperature sensor and the second temperature sensor, wherein the controller is configured to determine whether the flow of cooling medium in the heat exchanger is too low based on a temperature difference sensed by the first temperature sensor and the second temperature sensor during operation of the heat exchange system.

Optionally, in the heat exchange system, the controller is further configured to determine whether the flow of cooling medium in the heat exchanger is too low based on ambient temperature and the speed of the compressor.

Optionally, in the heat exchange system, the controller stores warning thresholds for temperature differences at various ambient temperatures and compressor speeds, and the controller is configured to determine whether the flow of cooling medium in the heat exchanger is too low based on a comparison between the actual sensed temperature difference and the warning threshold for temperature difference at the corresponding ambient temperature and compressor speed.

Optionally, in the heat exchange system, the refrigerant flow path of the heat exchange system comprises a pressure sensor upstream of the compressor for sensing the suction pressure of the compressor, and the controller determines whether the flow of cooling medium in the heat exchanger is too low based on the suction pressure of the compressor during the start-up or state-switching period of the heat exchange system.

Optionally, in the heat exchange system, the controller triggers the alarm and/or shuts down the heat exchange system when the flow of cooling medium is too low.

Optionally, in the heat exchange system, the refrigerant flow path and the heat exchanger are located in an outdoor unit, and the cooling medium flow path extends between the outdoor unit and an indoor unit.

Optionally, in the heat exchange system, a differential pressure flow switch is not included between the cooling medium inlet and the cooling medium outlet of the heat exchanger.

According to another aspect, a method for determining whether the flow of cooling medium passing through a heat exchanger is too low in a heat exchange system is provided, the heat exchanger system comprising: a refrigerant flow path in which refrigerant circulates and a compressor is included; a cooling medium flow path in which cooling medium circulates; and the heat exchanger connected to both the refrigerant flow path and the cooling medium flow path so that the refrigerant and the cooling medium exchange heat in the heat exchanger, wherein the method comprises: determining whether the flow of cooling medium in the heat exchanger is too low based on a temperature difference between the cooling medium inlet of the heat exchanger and the cooling medium outlet of the heat exchanger during operation of the heat exchange system.

Optionally, the method further comprises: setting warning thresholds for temperature differences between the cooling medium inlet of the heat exchanger and the cooling medium outlet of the heat exchanger at various ambient temperatures and compressor speeds; and determining whether the flow of cooling medium in the heat exchanger is too low based on a comparison between the actual sensed temperature difference and the warning threshold for temperature difference at the corresponding ambient temperature and compressor speed.

Optionally, the method further comprises determining whether the flow of cooling medium in the heat exchanger is too low based on the suction pressure of the compressor during the start-up or state-switching period of the heat exchange system.

The device and method according to the present invention determine whether the flow of cooling medium is too low through temperature difference.

BRIEF DESCRIPTION OF THE DRAWINGS

With reference to the accompanying drawings, the disclosure of the present application will become easier to understand. Those skilled in the art would readily appreciate that these drawings are for the purpose of illustration, and are not intended to limit the protection scope of the present application. In addition, in the figures, similar numerals are used to denote similar components, where.

DETAILED DESCRIPTION OF THE INVENTION

Figure 1:
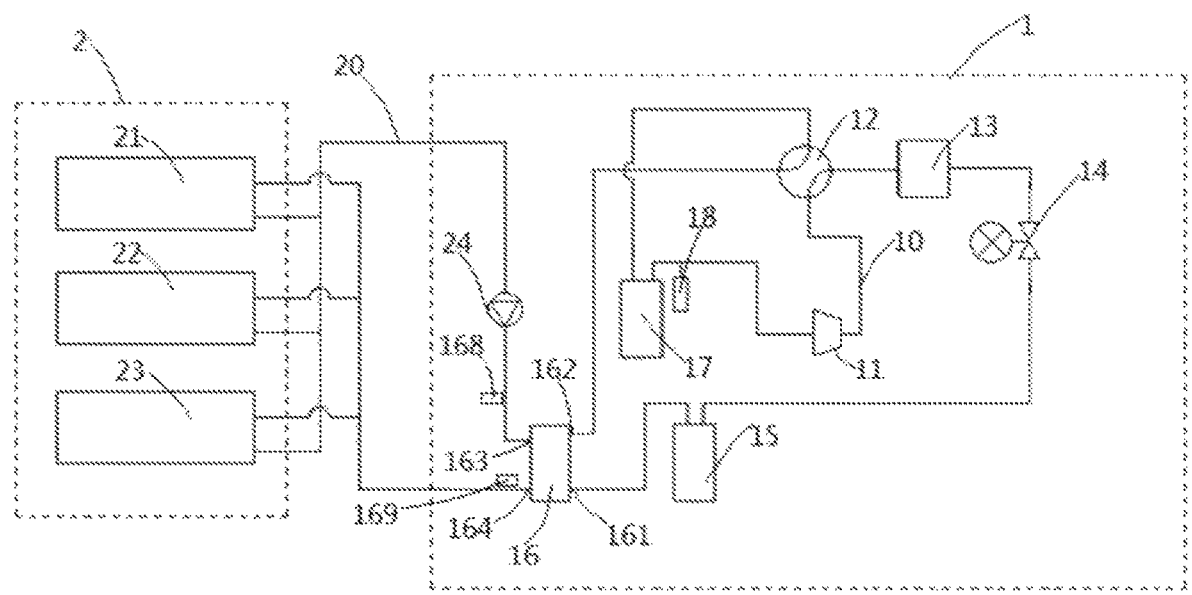
FIG. 1 is a schematic structural diagram of a heat exchange system according to an embodiment of the present invention.

Referring to FIG. 1, a schematic structural diagram of a heat exchange system according to an embodiment of the present invention is shown. The heat exchange system comprises a refrigerant flow path 10 and a cooling medium flow path 20. Refrigerant circulates in the refrigerant flow path 10. The refrigerant flow path 10 may comprise a compressor 11, a first heat exchanger 13, a throttling device 14 and a second heat exchanger 16. In addition, the refrigerant flow path 10 may optionally comprise a four-way reversing valve 12, a reservoir 15, a gas-liquid separator 17 and other components. In some cases, the refrigerant flow path 10 is entirely located in an outdoor unit 1. In an alternative embodiment, the refrigerant flow path 10 may also be partially located outdoors and partially indoors. On the other hand, the cooling medium circulates in the cooling medium flow path 20. The cooling medium is usually water, which may freeze in low temperature environment. The cooling medium flow path 20 comprises a pump 24, a second heat exchanger 16, and a plurality of loads 21, 22, 23 that are located in an indoor unit 2. Therefore, the illustrated cooling medium flow path in the heat exchange system extends between the indoor unit 2 and the outdoor unit 1, thereby transferring thermal energy. It can be seen that both the refrigerant flow path 10 and the cooling medium flow path 20 pass through the second heat exchanger 16, so that the refrigerant and cooling medium exchange heat in the second heat exchanger 16. More specifically, the second heat exchanger 16 comprises a first refrigerant port 161, a second refrigerant port 162, and the first flow path between the first refrigerant port 161 and the second refrigerant port 162. The second heat exchanger 16 is connected to the refrigerant flow path 10 through the first refrigerant port 161 and the second refrigerant port 162. The second heat exchanger 16 further comprises a cooling medium inlet 163, a cooling medium outlet 164, and the second flow path between the cooling medium inlet 163 and the cooling medium outlet 164. The cooling medium inlet 163 and the cooling medium outlet 164 of the second heat exchanger 16 are connected to the cooling medium flow path 20, and the refrigerant in the first flow path and the cooling medium in the second flow path exchange heat in the second heat exchanger 16.

Figure 2:
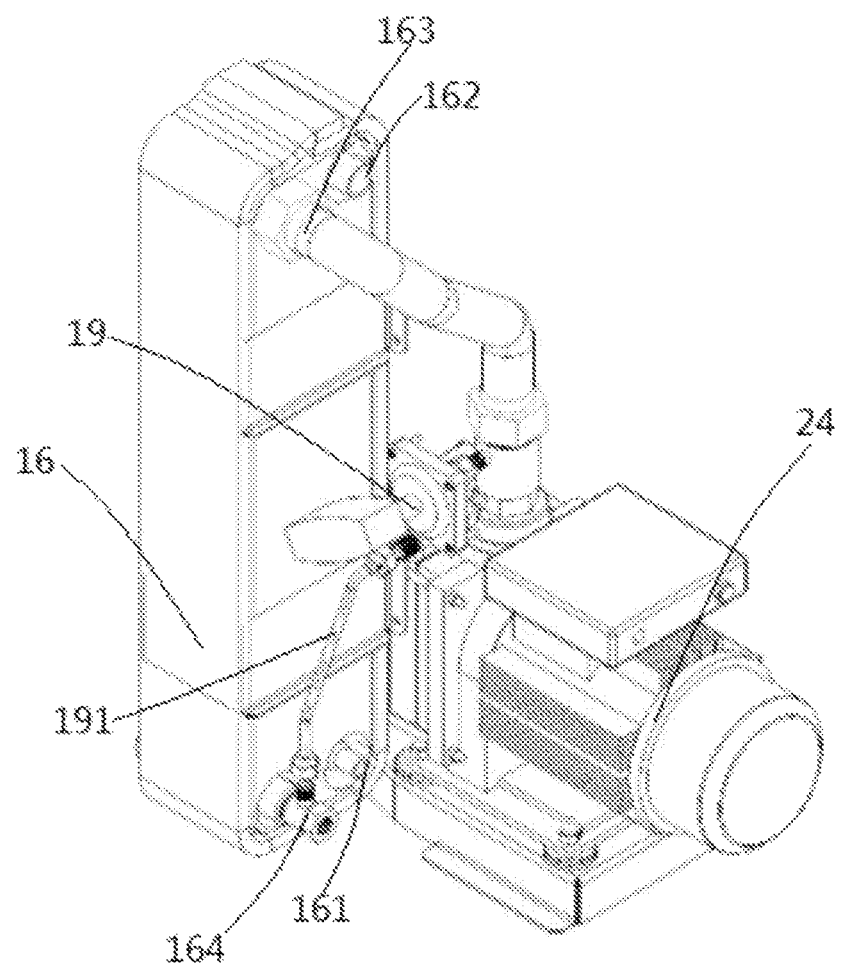
FIG. 2 depicts a conventional heat exchanger including a differential pressure flow switch.

The flow of the cooling medium in the second heat exchanger 16 needs to be monitored so as to provide warning when the flow of cooling medium is low (e.g., to prevent freezing, leakage and the like), as the cooling capacity of the refrigerant may cause the cooling medium to freeze when the flow of cooling medium is relatively low. FIG. 2 shows a solution of an existing design. A differential pressure flow switch 19 is arranged between the first cooling medium port 163 (i.e. the cooling medium inlet) and the second cooling medium port 164 (i.e. the cooling medium outlet) of the second heat exchanger 16. It is connected to the cooling medium inlet and the cooling medium outlet respectively through a pipeline 191, thus determining whether the flow is too low through differential pressure. However, since there is cooling medium in the pipeline 191 of the differential pressure flow switch 19, the differential pressure flow switch itself has the risk of freezing.

In an embodiment according to the present invention, the heat exchange system further comprises a first temperature sensor 168 at the cooling medium inlet 163 of the second heat exchanger, a second temperature sensor 169 at the cooling medium outlet 164 of the second heat exchanger, and a controller (not shown) in communication with the first temperature sensor 168 and the second temperature sensor 169. The controller is configured to determine whether the flow of cooling medium in the heat exchanger is too low based on the temperature difference sensed by the first temperature sensor 168 and the second temperature sensor 169 during operation of the heat exchange system. For example, when the temperature difference is below or equal to the threshold, the flow is considered to be normal, and when the temperature difference is above the threshold, the flow is considered to be too low. The threshold can be obtained from empirical data.

In some embodiments, the controller also takes into account ambient temperature and the speed of the compressor when determining whether the flow of cooling medium in the heat exchanger is too low. For example, in some embodiments, warning thresholds for temperature differences at various ambient temperatures and compressor speeds are stored in the controller (e.g., in the form of a look-up table or model), and the controller is configured to determine whether the flow of cooling medium in the heat exchanger is too low based on a comparison between the actual sensed temperature difference and the warning threshold for temperature difference at the corresponding ambient temperature and compressor speed. If the actual monitored temperature difference at a specific ambient temperature and compressor speed is greater than the threshold for temperature difference at the ambient temperature and compressor speed, the flow is determined to be too low, or else the flow is determined to be normal. In some embodiments, the controller triggers the alarm and/or shuts down the heat exchange system when the flow of cooling medium is too low. And then, a worker can check the unit for leaks or other problems.

Figure 3:
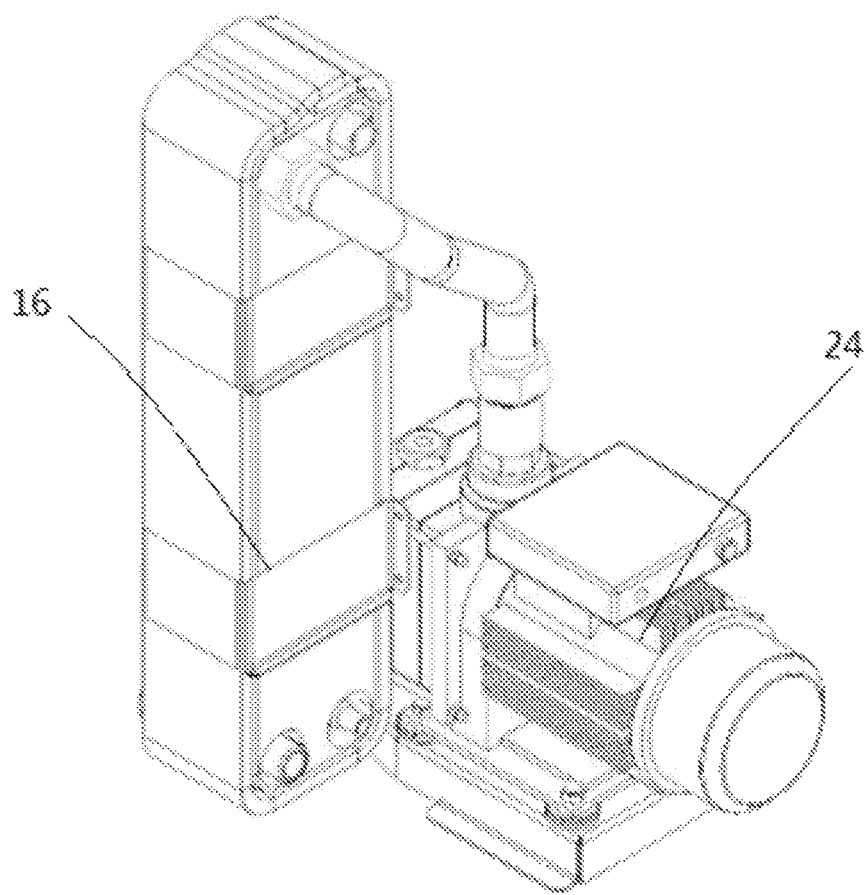
FIG. 3 depicts a heat exchanger according to an embodiment of the present invention.

The system according to the embodiments of the present invention realizes monitoring of low cooling medium flow in the heat exchanger through temperature difference and logic control, which makes it possible to omit the use of differential pressure flow switch for cost savings and to avoid the failure of the differential pressure flow switch due to freezing. In some embodiments, as shown in FIG. 3, a differential pressure flow switch may not be included between the cooling medium inlet and the cooling medium outlet of the heat exchanger. Alternatively, said device can also be a supplement to a differential pressure flow switch.

The operation period of a heat exchange system refers to the period during which the system operates stably, but not the unsteady-state period such as the start-up or state-switching period. During the unsteady-state period as mentioned above, because the temperature of the cooling medium is not yet stable and the temperature change of water is relatively slow due to its large thermal capacity, using temperature difference to determine whether the flow is too low will lead to larger errors. At this point, a compressor suction pressure sensor 18 upstream of the compressor 11 may be arranged in the refrigerant flow path of the heat exchange system. The controller determines whether the flow of the cooling medium in the heat exchanger is too low during the unsteady-state period of the heat exchange system, such as the start-up or state-switching period, based on the compressor suction pressure. That is, the actual measured compressor suction pressure is compared with the threshold of the compressor suction pressure, such that when the measured compressor suction pressure is below the threshold, it is determined that the flow of cooling refrigerant is too low, or else the flow of cooling refrigerant is within the normal range.

According to other embodiments of the present invention, a method for determining whether the flow of cooling medium passing through a heat exchanger is too low in a heat exchange system is further provided. The heat exchange system may be the heat exchange system depicted in FIGS. 1 and 3, which comprises: a refrigerant flow path, a cooling medium flow path and a heat exchanger. The aforementioned method comprises: determining whether the flow of cooling medium in the heat exchanger is too low based on the temperature difference between the cooling medium inlet of the heat exchanger and the cooling medium outlet of the heat exchanger during operation of the heat exchange system. This method makes it possible to omit the use of the differential pressure flow switch 19, thereby saving system costs and avoiding problems caused by a malfunction of the differential pressure flow switch 19.

According to some embodiments, the method further comprises: obtaining warning thresholds for temperature differences between the cooling medium inlet of the heat exchanger and the cooling medium outlet of the heat exchanger at various ambient temperatures and compressor speeds; and determining whether the flow of cooling medium in the heat exchanger is too low based on a comparison between the actual sensed temperature difference and the warning threshold for temperature difference at the corresponding ambient temperature and compressor speed. According to some embodiments, the method further comprises determining whether the flow of cooling medium in the heat exchanger is too low based on the suction pressure of the compressor during the start-up or state-switching period of the heat exchange system.

The specific embodiments of the present application described above are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. A heat exchange system comprising:
    a refrigerant flow path in which refrigerant circulates and a compressor is included;
    a cooling medium flow path in which cooling medium circulates; and
    a heat exchanger connected to both the refrigerant flow path and the cooling medium flow path so that the refrigerant and the cooling medium exchange heat in the heat exchanger, wherein the heat exchange system further comprises a first temperature sensor arranged at a cooling medium inlet of the heat exchanger, a second temperature sensor at a cooling medium outlet of the heat exchanger, and a controller in communication with the first temperature sensor and the second temperature sensor, wherein the controller is configured to determine whether flow of cooling medium in the heat exchanger is below a flow threshold based on a temperature difference sensed by the first temperature sensor and the second temperature sensor during operation of the heat exchange system;
    wherein the controller is further configured to determine whether the flow of cooling medium in the heat exchanger is below the flow threshold based on ambient temperature and speed of the compressor.

2. The heat exchange system according to claim 1, wherein the controller stores warning thresholds for temperature differences at various ambient temperatures and compressor speeds, and the controller is configured to determine whether the flow of cooling medium in the heat exchanger is below the flow threshold based on a comparison between an actual sensed temperature difference and a warning threshold for temperature difference at a corresponding ambient temperature and compressor speed.

3. The heat exchange system according to claim 1, wherein the refrigerant flow path of the heat exchange system comprises a pressure sensor upstream of the compressor for sensing an suction pressure of the compressor, and the controller determines whether the flow of cooling medium in the heat exchanger is below the flow threshold based on the suction pressure of the compressor during a start-up or state-switching period of the heat exchange system.

4. The heat exchange system according to claim 2, wherein the controller triggers an alarm and/or shuts down the heat exchange system when the flow of cooling medium is below the flow threshold.

5. The heat exchange system according to claim 1, wherein the refrigerant flow path and the heat exchanger are located in an outdoor unit and the cooling medium flow path extends between the outdoor unit and an indoor unit.

6. The heat exchange system according to claim 1, wherein a differential pressure flow switch is not included between the cooling medium inlet and the cooling medium outlet of the heat exchanger.

7. A method for determining whether flow of cooling medium flowing through a heat exchanger is too low in a heat exchange system, the heat exchange system comprising: a refrigerant flow path in which refrigerant circulates and a compressor is included; a cooling medium flow path in which cooling medium circulates; and the heat exchanger connected to both the refrigerant flow path and the cooling medium flow path so that the refrigerant and the cooling medium exchange heat in the heat exchanger, wherein the method comprises:
    determining whether the flow of cooling medium in the heat exchanger is below a flow threshold based on a temperature difference between a cooling medium inlet of the heat exchanger and a cooling medium outlet of the heat exchanger during operation of the heat exchange system; and
    setting warning thresholds for temperature differences between the cooling medium inlet of the heat exchanger and the cooling medium outlet of the heat exchanger at various ambient temperatures and compressor speeds.

8. The method according to claim 7, further comprising:
    determining whether the flow of cooling medium in the heat exchanger is below the flow threshold based on a comparison between an actual sensed temperature difference and the warning threshold for temperature difference at a corresponding ambient temperature and compressor speed.

9. The method according to claim 7, further comprising determining whether the flow of cooling medium in the heat exchanger is below the flow threshold based on a suction pressure of the compressor during a start-up or state-switching period of the heat exchange system.

* * * * *